(12) United States Patent
Swan

(10) Patent No.: US 9,605,697 B2
(45) Date of Patent: Mar. 28, 2017

(54) MODULAR CLAMPING SYSTEM

(71) Applicant: Christopher A. Swan, Templeton, CA (US)

(72) Inventor: Christopher A. Swan, Templeton, CA (US)

( * ) Notice: Subject to any disclaimer, the term of this patent is extended or adjusted under 35 U.S.C. 154(b) by 45 days.

(21) Appl. No.: 14/714,110

(22) Filed: May 15, 2015

(65) Prior Publication Data

US 2015/0247515 A1 Sep. 3, 2015

Related U.S. Application Data

(63) Continuation of application No. 13/467,905, filed on May 9, 2012, now Pat. No. 9,057,394.

(Continued)

(51) Int. Cl.

| | |
|---|---|
| *F16B 2/18* | (2006.01) |
| *F16M 13/02* | (2006.01) |
| *G04D 1/00* | (2006.01) |
| *A47G 29/122* | (2006.01) |
| *F16L 5/00* | (2006.01) |
| *A47G 29/02* | (2006.01) |
| *A47B 95/00* | (2006.01) |
| *B25B 5/00* | (2006.01) |
| *B23Q 3/06* | (2006.01) |

(Continued)

(52) U.S. Cl.
CPC ............ *F16B 2/185* (2013.01); *A47B 95/008* (2013.01); *A47G 29/02* (2013.01); *A47G 29/122* (2013.01); *B23Q 3/06* (2013.01); *B25B 5/00* (2013.01); *F16L 5/00* (2013.01); *F16M 13/027* (2013.01); *F21V 21/088* (2013.01); *G04D 1/00* (2013.01); *H04R 1/025* (2013.01); *H04R 1/026* (2013.01); *Y10T 29/49998* (2015.01)

(58) Field of Classification Search
CPC .. B25B 5/12; B25B 1/14; B25B 7/123; B25B 5/04; B25B 5/00; F16B 2/185; A47B 95/008; A47G 29/02; A47G 29/122; B23Q 3/06; F16L 5/00; F16M 13/027; F21V 21/088; G04D 1/00; H04R 1/025; H04R 1/026; Y10T 29/49998
USPC ................................ 269/228, 201, 91, 254 R
See application file for complete search history.

(56) References Cited

U.S. PATENT DOCUMENTS

| | | | | |
|---|---|---|---|---|
| 3,229,554 A | * | 1/1966 | Haddad | B25B 5/12 408/72 R |
| 3,371,925 A | * | 3/1968 | Blatt | B25B 5/12 269/228 |

(Continued)

OTHER PUBLICATIONS

Restriction Requirement for U.S. Appl. No. 13/467,905 mailed Jan. 8, 2014.

(Continued)

*Primary Examiner* — Joseph J Hail
*Assistant Examiner* — Marc Carlson
(74) *Attorney, Agent, or Firm* — Fitch, Even, Tabin & Flannery LLP

(57) ABSTRACT

A clamping system includes a housing, a clamping lever pivotally coupled relative to the housing, a clamping arm pivotally coupled relative to the housing and the clamping lever, and an expandable link coupled to the clamping arm. The clamping lever and the clamping arm are rotatable from an open position to a closed position. A method of mounting a device on a substrate using the clamping system is also provided.

6 Claims, 7 Drawing Sheets

Related U.S. Application Data

(60) Provisional application No. 61/518,568, filed on May 9, 2011.

(51) Int. Cl.
*F21V 21/088* (2006.01)
*H04R 1/02* (2006.01)

(56) References Cited

U.S. PATENT DOCUMENTS

| | | | | |
|---|---|---|---|---|
| 3,480,271 | A * | 11/1969 | Coutilish | B23K 37/0435 269/228 |
| 6,817,603 | B2 * | 11/2004 | Kofod | B25B 5/163 269/201 |
| 9,057,394 | B2 * | 6/2015 | Swan | F16B 2/185 |
| 2007/0267799 | A1 * | 11/2007 | Dykstra | B25B 5/08 269/228 |
| 2014/0096454 | A1 * | 4/2014 | Meiser | A61G 17/00 49/506 |
| 2014/0352116 | A1 * | 12/2014 | Woiler | B25B 5/08 24/489 |
| 2015/0247515 | A1 * | 9/2015 | Swan | F16B 2/185 248/27.1 |

OTHER PUBLICATIONS

Non-final office action for U.S. Appl. No. 13/467,905 mailed Jul. 15, 2014.

Notice of Allowance for U.S. Appl. No. 13/467,905 mailed Feb. 12, 2015.

* cited by examiner

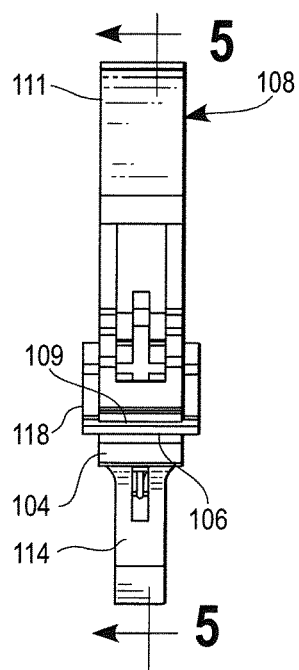
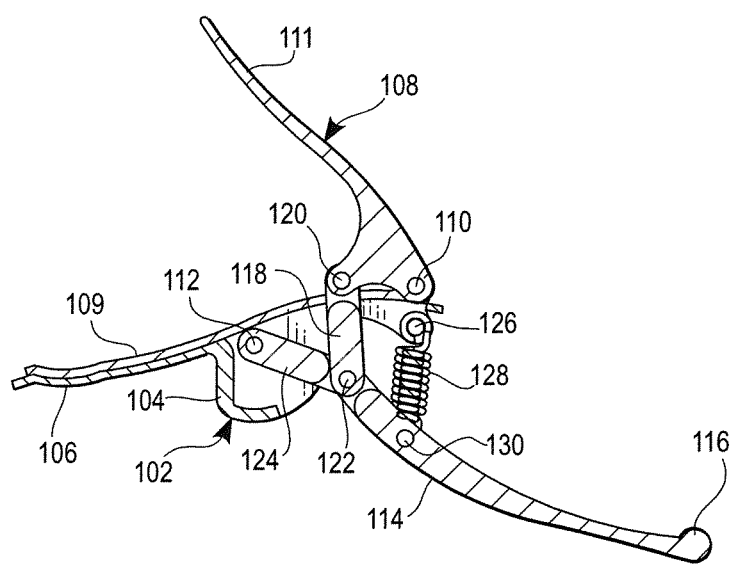

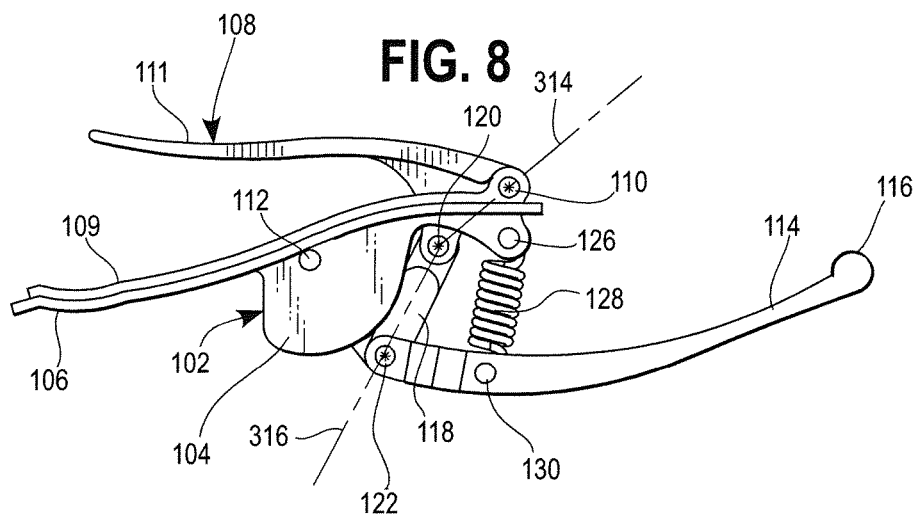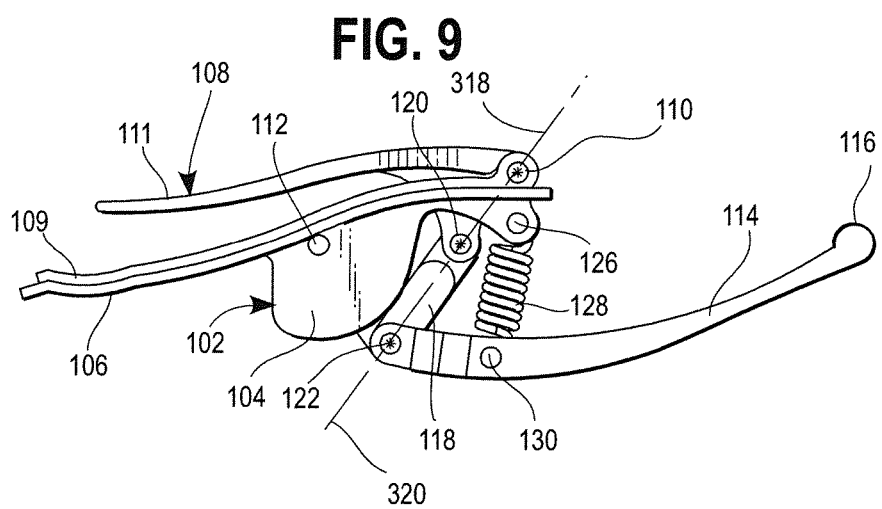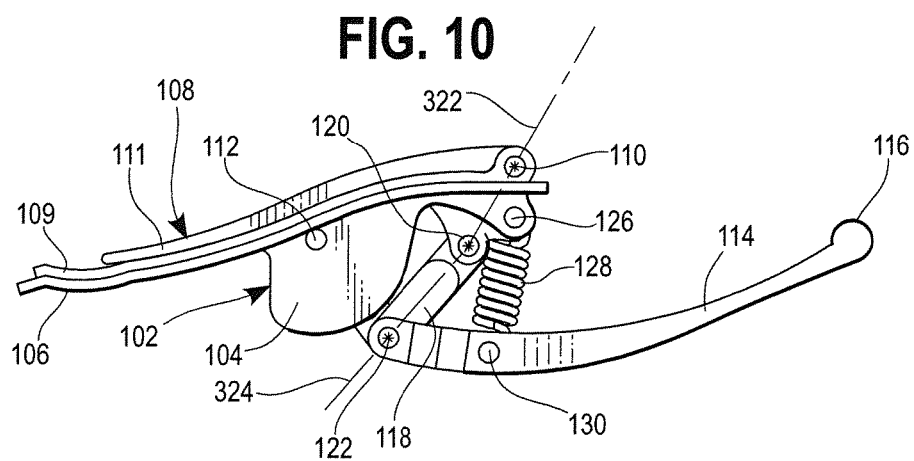

MODULAR CLAMPING SYSTEM

CROSS-REFERENCE TO RELATED APPLICATIONS

This application is a continuation of U.S. application Ser. No. 13/467,905, filed May 9, 2012, which claims the benefit of U.S. Provisional Application No. 61/518,568, filed May 9, 2011, both of which are incorporated in their entirety herein by reference

FIELD OF THE INVENTION

This invention relates to clamping devices, and in particular, to clamping devices for mounting various items on a surface.

BACKGROUND OF THE INVENTION

It is desirable to mount electronic equipment and other household items on walls and ceilings. The mounting process can be labor intensive and take a significant length of time. One installation step that takes significant time is the physical connection of the electronic device to the underlying structure such as drywall. For example, mounting sound system speakers or a medicine cabinet to a wall can require the use of multiple mounting brackets and multiple screws to tighten per bracket.

Accordingly, what is needed is a clamping system that not only reduces the time required to mount various electronic and non-electronic household devices to a structure such as wall or a ceiling, but which is modular and easily adaptable to a wide variety of other devices which may need to be mounted to a structure.

SUMMARY OF THE INVENTION

This invention satisfies this need. The foregoing advantages, as well as others, are realized in the present invention in its various embodiments.

In a preferred embodiment, a clamping system includes a housing, a clamping lever pivotally coupled relative to the housing, a clamping arm pivotally coupled relative to the housing and the clamping lever, and an expandable link coupled to the clamping arm. The clamping lever and the clamping arm are rotatable from an open position to a closed position.

The clamping lever can include a first arm and a second arm pivotally coupled to each other. The first arm can be attached to the housing, for example, via an adhesive. The first arm can be removably attached to the housing. The second arm can be in contact with the first arm when the clamping lever is in the closed position.

In one approach, rotation of the clamping lever toward the closed position causes rotation of the clamping arm toward the closed position.

The clamping lever can be rotatable to an over-toggle position configured to prevent the clamping lever from rotating toward the open position.

The clamping lever and the clamping arm can be substantially vertical when in the open position and substantially horizontal when in the closed position.

In one approach, the clamping lever can be pivotally coupled directly to the housing.

The clamping lever and the clamping arm can be pivotally coupled relative to each other via at least one link.

The clamping system can further include a first link coupling the clamping arm to the housing and a second link coupling the clamping lever to the clamping arm. The first and second links can be non-expandable. The first and second links can share a pivot axis.

In one approach, the expandable link can be a spring. The spring can be biased to pull the clamping arm toward the closed position.

The clamping arm can be configured to abut the housing the clamping arm is in the open position. The clamping lever and the housing can form a unitary structure.

The clamping arm and the clamping lever can rotate in the same direction from the open position toward the closed position.

A method of mounting a device on a substrate using the clamping system comprises inserting the clamping system at least partially into an opening in the device and through an opening in the substrate, actuating the clamping lever to rotate the clamping lever toward the closed position, and causing, via the actuating of the clamping lever, the clamping arm to rotate toward the closed position such that a portion of the clamping arm comes into contact with an interior surface of the substrate.

In one embodiment, a clamping system comprises a housing including a body portion and arm portion and a clamping lever having at least a first pivot joint and a second pivot joint. The clamping lever is pivotally coupled relative to the housing at the first pivot joint. The clamping system further comprises a clamping arm having a first end including at least one pivot joint and a second end adapted to abut a substrate surface. The clamping arm is pivotally coupled relative to the housing via a first link. The clamping lever and the clamping arm are pivotally coupled relative to each at the second pivot joint of the clamping lever and the at least one pivot joint of the clamping arm via a second link. The clamping arm is coupled to the housing via a third link that is expandable. The clamping lever and the clamping arm are rotatable from an open position to a closed position and rotation of the clamping lever toward the closed position causes movement of the first, second, and third links and the rotation of the clamping arm toward the closed position.

BRIEF DESCRIPTION OF THE DRAWINGS

FIG. 4 depicts a rear elevational view of the clamping system of FIG. 1

FIG. 5 depicts a sectional side elevational view of the clamping system of FIG. 1 taken along lines 5-5 of FIG. 4.

FIG. 8 depicts a side elevational view of the clamping system of FIG. 1 showing the linear relationship between several pivot points of the clamping system in an open position of an over-toggle implementation.

FIG. 9 depicts a side elevational view of the clamping system of FIG. 1 showing the linear relationship between several pivot points of the clamping system in an intermediate position of the over-toggle implementation.

FIG. 10 depicts a side elevational view of the clamping system of FIG. 1 showing the linear relationship between several pivot points of the clamping system in a closed position of the over-toggle implementation.

DETAILED DESCRIPTION OF THE DRAWINGS

Figure 1:
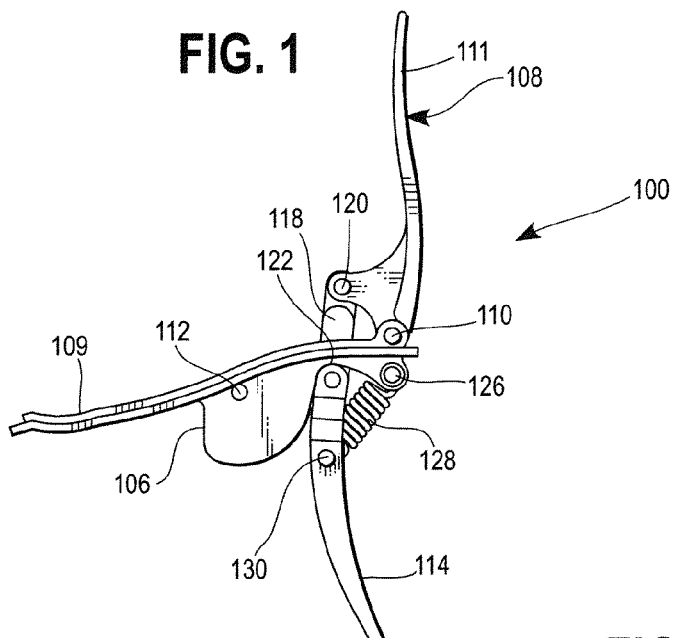
FIG. 1 depicts a side elevational view of a clamping system according to one embodiment of the present invention shown fully open.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Generally, a clamping system is provided. The clamping system can be used for mounting a variety of devices to various surfaces. For example only, the clamping system can be used to mount sound system speakers, clocks, lighting and plumbing fixtures, medicine cabinets, mailboxes, or the like on interior and exterior walls, ceilings, beams, doors, or the like.

Referring to FIGS. 1-5, a preferred embodiment of the clamping system 100 is shown. The clamping system 100 includes a housing 102 having a body portion 104 and an arm portion 106. The housing 102 can serve both as a support structure for the components of the clamping system 100 and to mount the clamping system 100 to an intended device and/or structure.

The clamping system 100 includes a clamping lever 108. As shown in FIG. 1, the clamping lever 108 can include a first arm 109 and a second arm 111 pivotally coupled relative to the first arm 109. For example, the first arm 109 and the second arm 111 can be coupled to each other at a pivot joint 110 that may include a pivot pin. For purposes of this application, a pivot joint will be understood to mean any structure or assembly that provides for a member which includes or is connected to the pivot joint to rotate, pivot, or turn. For example only, the pivot joint can be in the form of a pivot pin/pinhole assembly, a hinge assembly, a ball bearing assembly, a link assembly, or the like. The pivot joint 110 can be fixed as shown in FIG. 1 or may alternatively be movable. The first arm 109 can be removably or nonremobably attached to the arm portion 106 of the housing 102, for example via an interlocking lock and pin assembly, an adhesive, welding, injection molding, or the like.

In an alternative approach, the clamping lever 108 can comprise only one arm 111 which is pivotally coupled directly to the housing 102 via the pivot joint 110. While the clamping lever 108 has been shown in FIG. 1 as being substantially sigmoidal, it is to be appreciated that the clamping lever 108 can be entirely or partially curved or entirely or partially straight, or can have any other suitable shape. The first arm 109 of the clamping lever 108 may be made of a rigid material or materials or may be flexible. The clamping lever 108 can be actuated by a user to mount a household device to a desired structure as discussed hereinbelow.

Referring to FIG. 5, the clamping system 100 further includes a clamping arm 114. The clamping arm 114 is elongate and can be curved as shown in FIG. 5, or can be at least in part straight or undulating. The clamping arm 114 may be made of a rigid material or materials or may be flexible. One of the ends of the clamping arm 114 can include a bulbous end portion 116 as shown, for example, in FIG. 5. The bulbous end portion 116, if present, can provide an anchoring structure to the clamping arm 114 when the clamping arm 114 is positioned in contact with a drywall surface. The end portion 116 can restrict and/or prevent slippage of the clamping arm 114. It is to be appreciated that instead of having the bulbous end portion 116, the clamping arm 114 may be made of a spring metal material or may include a lip, a ridge, a shoulder, an abutment, or any other structure suitable for anchoring the clamping arm 114 on the interior surface of the drywall.

With continuing reference to FIG. 5, the clamping arm 114 is can be pivotally coupled relative to the housing 102 and the clamping lever 108 either directly, or via one or more links. For example, the clamping arm 114 can be pivotally coupled relative to the clamping lever 108 via a link 118 coupled to pivot joints 120 and 122 that can include pivot pins. The clamping arm 114 can be also pivotally coupled relative to the housing 102 via a link 124 coupled to pivot joints 112 and 122 that can include pivot pins. The clamping arm 114 can be further coupled relative to the housing 102 via an adjustable or expandable link 128 coupled to pivot joints 126 and 130. The expandable link 128 can be in the form of a spring, which can expand upon rotation of the clamping arm 114 in a clockwise direction and contract upon rotation of the clamping arm 114 in a counterclockwise direction.

It is to be appreciated that instead of the expandable link 128, the clamping system 100 may include an adjustable or telescopic link, or a rigid link and a flexible clamping arm. The spring 128 can be biased to pull the clamping arm 114 toward the closed position shown in FIG. 3. The components of the clamping system 100 can be made of a variety of materials such as metals and plastics including, but not limited to, aluminum, stainless steel, zinc, pot metal, acrylonitrile butadiene styrene (ABS), polypropylene (PP), polycarbonate (PC), Nylon, wood, medium density fibreboard (MDF), or the like. The clamping system 100 can also be made in a variety of shapes and sizes and is also adaptable to accommodate substrates of varying thicknesses as discussed below.

The first arm 109 in the embodiment shown in FIGS. 1-5 is generally a rectangular plate shape. In some embodiments the rectangular plate shape may be curved as shown in FIGS. 1-5. The first arm 109 includes an exterior side distal to the housing and an interior side proximate to the housing 106. The first arm 109 also includes a first arm end proximate to the pivotal joint 110.

Figure 2:
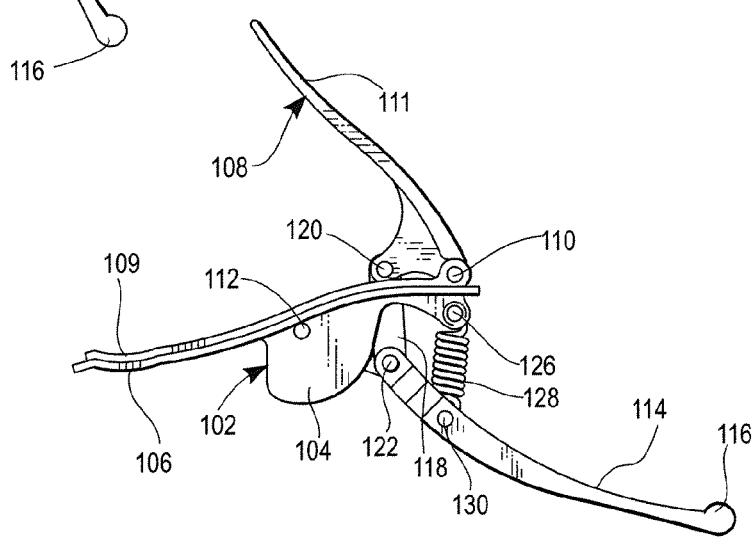
FIG. 2 depicts the clamping system of FIG. 1 shown with the clamping lever and the clamping arm being partially moved toward the closed position.
Figure 3:
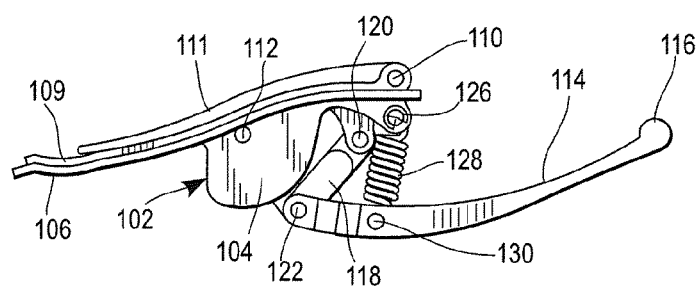
FIG. 3 depicts the clamping system of FIG. 1 shown with the clamping lever and the clamping arm being in the closed position.

The components of the clamping system 100 can be movable from an open or unlocked position shown in FIG. 1 to a closed or locked position shown in FIG. 3. In the open configuration of FIG. 1, the clamping lever 108 is substantially vertical. As the user actuates the clamping lever 108, the clamping lever 108 pivots about the pivot joints 110 and 120 and rotates through an intermediate position shown in FIG. 2 to a locked position shown in FIG. 3. As shown in FIGS. 1-3, the clamping arm 114 rotates in a plane generally perpendicular to the interior surface, and the clamping lever 108 rotates in a plane generally perpendicular to the exterior surface. The rotation of the clamping lever 108 through its range of motion from the open position toward the closed position causes movement of the links 118, 124, and 128 and the clamping arm 114 to pivot about the pivot joint 122 from its open position shown in FIG. 1 to an intermediate position shown in FIG. 2 and to the locked position shown in FIG. 3. As shown in FIG. 3, a substantial portion of the clamping lever remains on the exterior side of the first arm when the clamping lever is in the closed (locked) position. In the open position, a portion of the clamping arm 114 abuts the body portion 104 of the housing 102 and is prevented from rotating past the open position as shown in FIG. 1. When the clamping lever 108 is in the closed position, the clamping arm 114 is rotated towards the first arm end, as shown in FIG. 3.

Figure 6:
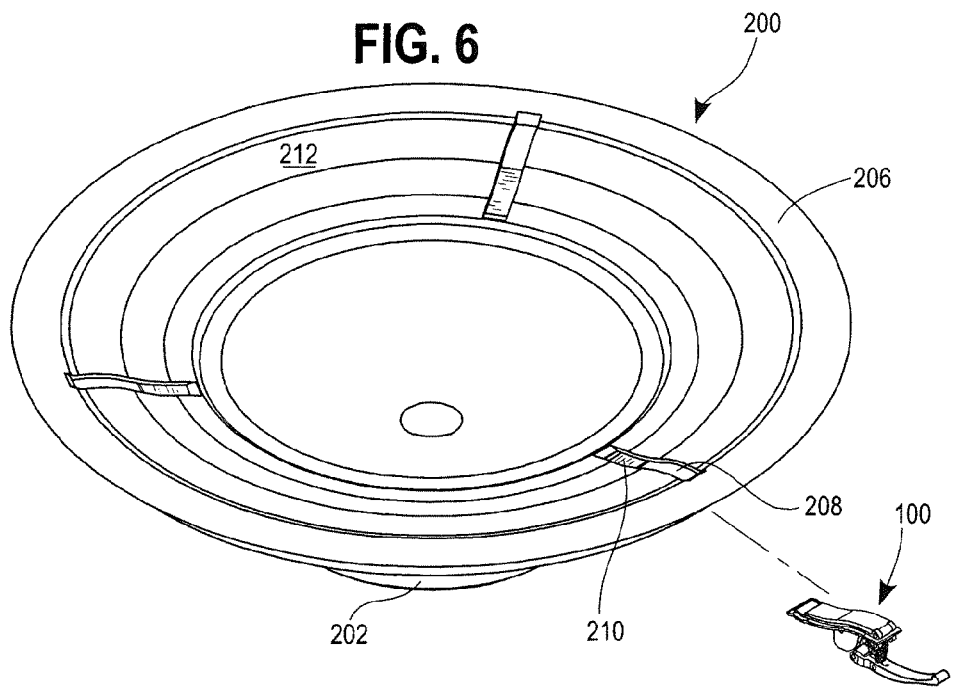
FIG. 6 depicts a perspective exploded view of an exemplary device that can be mounted on a substrate with the clamping system of FIG. 1

The clamping system 100 is modular and can be interchangeably used with a variety of electronic or non-electronic devices and household items. As such, the clamping system 100 can be a self contained clamping module which can be installed into an appropriate structure of any suitable device, for example, a slot 208 of a sound system speaker 200 as shown in FIG. 6. Numerous other configurations of the clamping system 100 and devices to be mounted to a substrate would be apparent to one skilled in the art.

Figure 7:
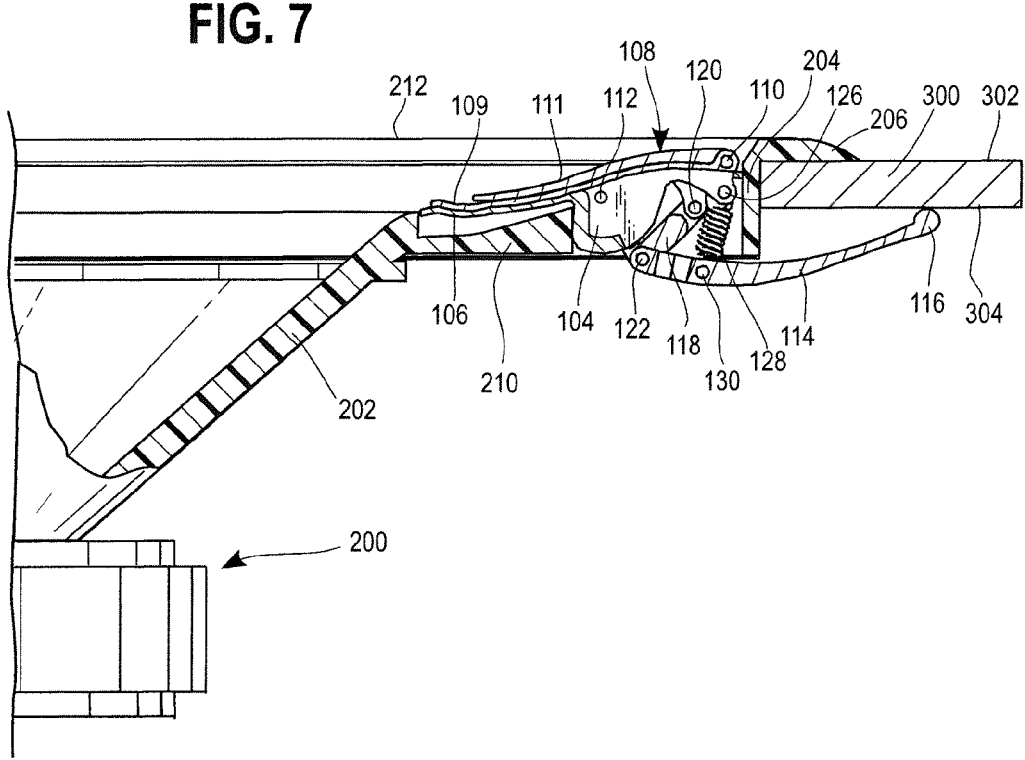
FIG. 7 depicts a partial enlarged side elevational view of the device of FIG. 6 being mounted to a surface such as a drywall with the clamping system of FIG. 1 being shown in cross-section.

Referring to FIG. 7, the speaker 200 can have a body portion 202 including a side wall 204 that includes a projecting flange 206 which can be substantially perpendicular to the side wall 204. The speaker 200 can include one or more through openings or slots 208 sized and shaped to receive the clamping system 100. The speaker 200 can be mounted on a structure such as a wall 300 substantially as shown in FIG. 7. The wall 300 has an exterior surface 302 which would face a user and an interior surface 304 which would not be visible to a user. The speaker 200 can be positioned relative to the wall 300 such that the flange 206 of the speaker 200 can abut the exterior surface 302 of the wall 300 as shown in FIG. 7.

Typically, an opening would be made in the wall 300 to permit the insertion of at least a portion of the clamping system 100 therethrough. The clamping system 100 can be inserted into the slot 208 of the speaker 200 such that the clamping arm 114 passes through the slot and the opening in the wall 300 and extends on the interior of the wall 300 until the bulbous end portion 116 of the clamping arm 114 abuts the interior surface 304 of the wall 300 as shown in FIG. 7. As such, the clamping system the speaker 200 can be secured on the wall 300 via the cooperation of the flange 206 of the speaker 200 and the clamping arm 114 of the clamping system 100.

The clamping system 100 can be recessed within a slot 208 in the speaker 200 so that the arm 111 of the clamping lever 108 can be below the upper surface 212 of the speaker 200 as shown in FIG. 7. As shown in FIG. 6, the arm 111 of the clamping lever 108 of the clamping system 100 can be contoured to correspond to the shape of the portions of the upper surface 212 of the speaker 200 that surround the slots 208. As such, the clamping system 100 may be positioned in the slot 208 of the speaker 200 such that the arm 111 of the clamping lever 108 does not protrude above the upper surface 212 of the speaker 200, but is flush with the upper surface 212 of the speaker 200, so that the upper surface 212 of the speaker 200 is contiguous.

The clamping system 100 can be secured in the slot 208 in a variety of ways. In one approach shown in FIG. 7, the interior of the slot 208 can include an inclined platform 210 which acts as a stop for the housing 202 and prevents the entire clamping system 100 from passing through the slot 208. In another approach, the slot 208 can include a structure such as a lip, a ridge, or a shoulder that would secure the clamping system 100 within the slot 208. In yet another approach, the clamping system 100 can be secured within the slot 208 by a fastener such as a set screw passing through a portion of the speaker 200, the slot 208 and the housing 102 of the clamping system 100.

Referring to FIGS. 8-10, the clamping system 100 can be locked so that a desired device is permanently affixed to a structure. One such locking method usable with the clamping system 100 can be a mechanical over-toggle as described in more detail below.

Referring to FIG. 8, the clamping lever 108 can be actuated by a user as described above in reference to FIGS. 1-3. An axis 314 passing through the fixed pivot joint 110 of the clamping lever 108 and the pivot joint 120 defines one side of the over-toggle mechanism. An axis 316 passing through the pivot joint 120 and the pivot joint 122 of the clamping arm 114 defines the second side of the over-toggle mechanism. As the clamping lever 108 is actuated by a user from an open position toward a locked position and brought to a position shown in FIG. 8, axes 314 and 316 form an obtuse angle to the right, indicating that the clamping lever 108 is in the pre-toggle position. As the clamping lever 108 continues through its motion toward the locked position and is brought to a position shown in FIG. 9, the pivot joints 110, 120 and 122 become co-linear, as indicated by axes 318 and 320.

The configuration shown in FIG. 9 is the toggle point where the clamping arm 114 reaches its further position of travel. As the clamping lever 108 continues through its rotation toward the locked position and is brought to a position shown in FIG. 10, the clamping lever 108 becomes fully clamped. At this point, the pivots joints 110 and 122 have moved past the toggle axes 318 and 320 of FIG. 9 and reached their final positions indicated by axes 322 and 324 in FIG. 10. The axes 322 and 324 form an obtuse angle to the left as shown in FIG. 10, indicating a fully clamped position of stability. In the fully clamped position shown in FIG. 10, the clamping arm 114 reaches its resting position such that any force on the clamping system 100 will attempt to push the clamping arm 114 further past its resting position, resulting in the tightening of the over-toggle mechanism.

In another approach, the clamping system 100 may include one or more screws driven through the clamping lever 108 into the housing 102 of the clamping system 100, or through the device being mounted to mechanically secure the clamping lever 1008 in its fully clamped position.

Referring to FIGS. 11-14, one method of accommodating various substrate thicknesses within the clamping system 100 is described.

When fully actuated, the clamping lever 108 rotates to the closed position as described above. With the clamping lever 108 moving into the closed position, the clamping arm 114 is caused to move into its closed position, including the over-toggle described above. The expandable link 128 of the clamping system 100 permits the clamping arm 114 to be rotated to various positions accommodating substrates 406, 408, and 410 having different thickness.

Figure 11:
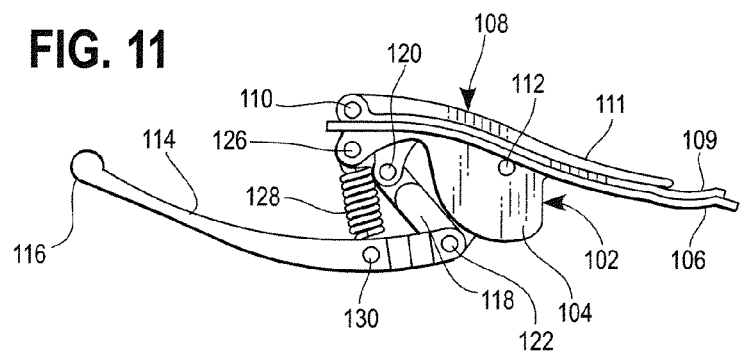
FIG. 11 depicts a side elevational view of the clamping system of FIG. 1 not mounted to a substrate and the expandable link in a relaxed position.
Figure 12:
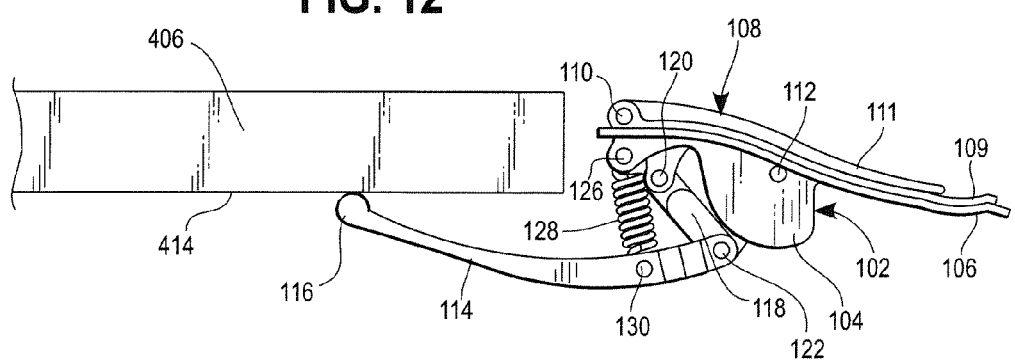
FIG. 12 depicts the same view as in FIG. 11, but showing the clamping system of FIG. 1 mounted to a drywall with the expandable link slightly extended.
Figure 13:
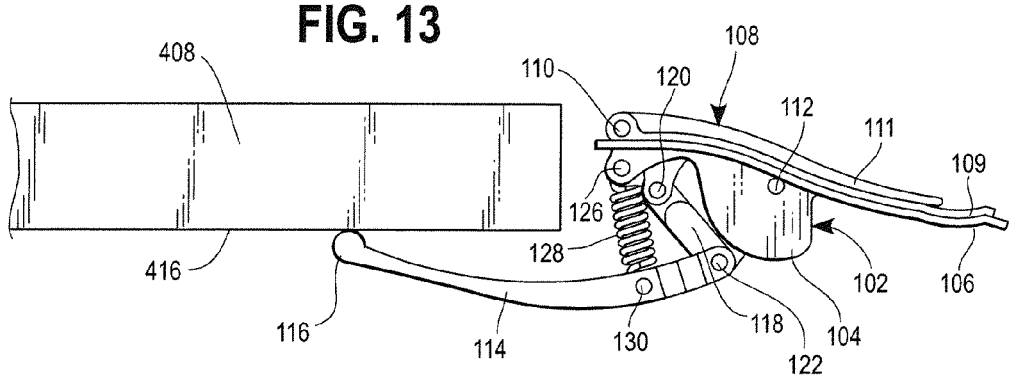
FIG. 13 is the same view as in FIG. 12, but showing the clamping system mounted to a drywall that is thicker than the drywall of FIG. 12 shown with the expandable link slightly further extended compared to FIG. 12.
Figure 14:
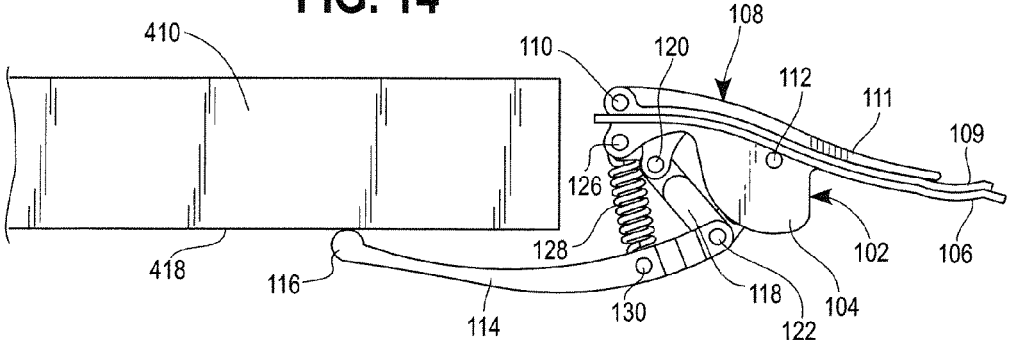
FIG. 14 is the same view as in FIG. 13, but showing the clamping system mounted to a drywall that is thicker than the drywall of FIG. 13 shown with the expandable link slightly further extended compared to FIG. 13.

The expandable link in the form of a spring 128 of the clamping system 100 is shown in four different positions in FIGS. 11-14. In FIG. 11, the spring 128 is shown in a relaxed or fully retracted position with no substrate. In FIGS. 12-14, the spring 128 is shown in increasingly expanded positions when used with substrates 406, 408, and 410 each having a progressively increasing thickness. It is to be appreciated that FIGS. 11-14 are exemplary and not intended to be to scale and that the clamping system 100 may be made in a variety of sizes to accommodate a variety of substrates having differing thicknesses. In one exemplary approach, the clamping system 100 may be from 1.0 inch to 1.25 inch in length, the substrate 406 may have a thickness of 0.5 inch, the substrate 408 may have a thickness of 0.675 inch, and the substrate 410 may have a thickness of 0.75 inch. In each instance, a portion of the clamping arm 114, in this embodiment, end portion 116, contacts the interior surface, 414, 416, and 418 of the substrate, respectively, as shown in FIGS. 12-14. Thus, as the substrate becomes progressively thicker, the adjustable link 128 can expands to accommodate the substrate thickness, permitting the clamping system 100 to be used with substrates of varying thickness.

Referring now to FIGS. 15-19, various examples and applications of the modular clamping system 100 are shown to provide illustrations of certain exemplary usages of the clamping system 100. Although the clamping system 100 has been illustrated in FIGS. 15-19 in use with electronic devices such as speakers, the clamping system 100 can be used with various other electronic or non-electronic devices and numerous other configurations and combinations of the components are considered to be within the scope of the present invention.

Figure 15:
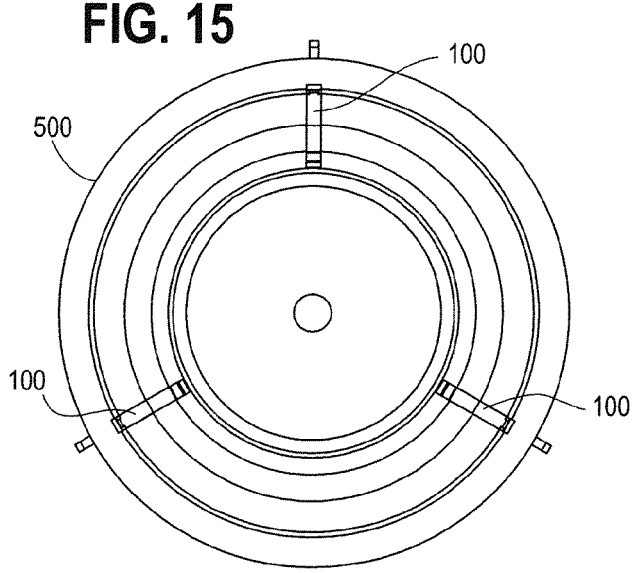
FIG. 15 depicts a side elevational view of the device of FIG. 6 being shown fitted with three clamping systems of FIG. 1.

FIG. 15 shows a round loudspeaker 500, which is also representative of any round electronic or non-electronic device. To clamp a relatively light device such as the loudspeaker 500 to a substrate such as a wall, only three clamping systems 100 can be sufficient. As such, FIG. 15 shows the loudspeaker 500 fitted with three clamping systems 100.

Figure 16:
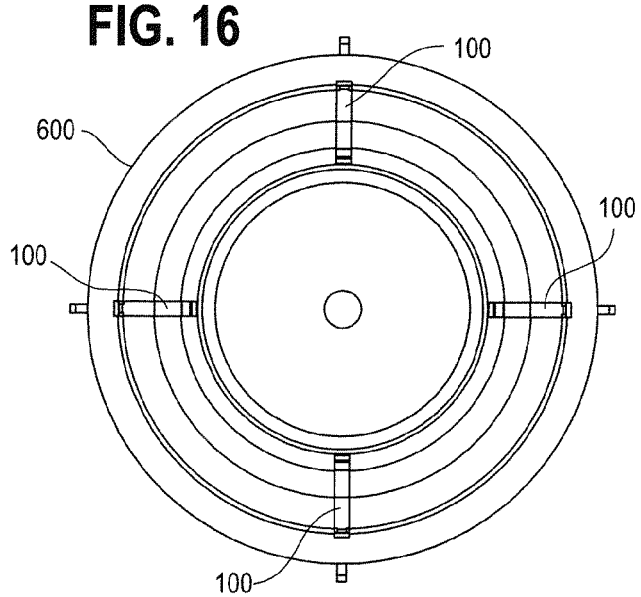
FIG. 16 depicts a side elevational view of another exemplary device being shown fitted with four clamping systems of FIG. 1.

FIG. 16 shows a round loudspeaker 600 which is also representative of any round electronic or non-electronic device that is heavier and/or larger in size than the round device 500 of FIG. 15. To sufficiently clamp a more massive device 600 to the substrate, it may be desirable to use more than three clamping systems 100. For example, the device 600 can be mounted on the substrate via four clamping systems 100.

Figure 17:
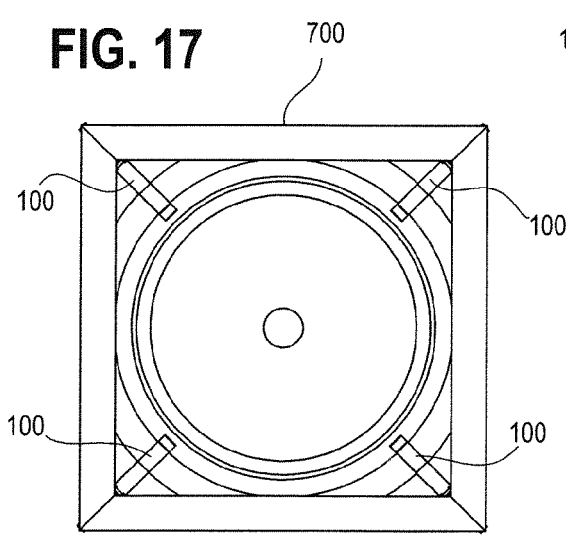
FIG. 17 depicts a side elevational view of another exemplary device being shown fitted with four clamping systems of FIG. 1.
Figure 18:
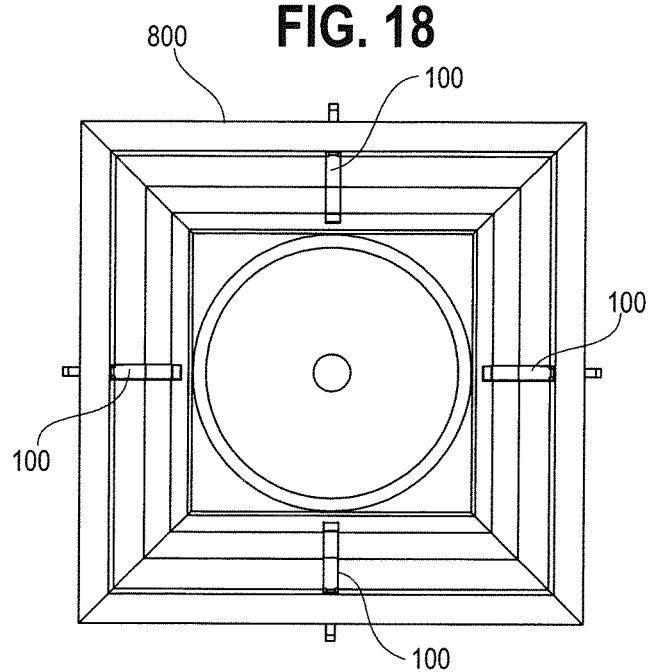
FIG. 18 depicts a side elevational view of another exemplary device being shown fitted with four clamping systems of FIG. 1.
Figure 19:
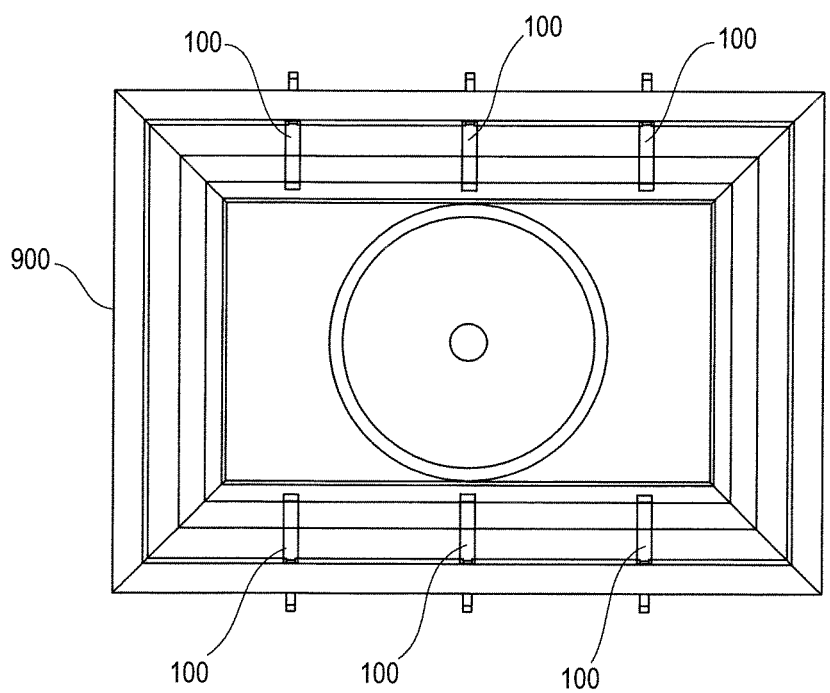
FIG. 19 depicts a side elevational view of another exemplary device being shown fitted with six clamping systems of FIG. 1.

FIGS. 17-19 show examples of the use of the modular clamping system 100 with progressively larger and/or heavier rectangular loudspeakers 700, 800, and 900, respectively. It is to be appreciated that the loudspeakers 700, 800, and 900 can be representative of any rectangular electronic or non-electronic device. FIGS. 17 and 18 show four clamping systems 100 fitted into the speakers 700 and 800, while FIG. 19 shows a considerably larger and/or heavier speaker 900 which can be mounted on a substrate using six clamping systems 100.

The foregoing exemplary embodiments describe a modular clamping system that can be interchangeably used with a large variety devices and fixtures to mount the devices and fixtures onto underlying substrates such as walls, ceilings, doors, or the like. The clamping system described above provides a cost-effective and time saving alternative to the devices presently used to secure various devices and fixtures onto underlying substrates.

It is understood that the above-described arrangements are only illustrative of the application of the basic principles of the present invention. Numerous modifications and alternative arrangements may be devised by those skilled in the art without departing from the spirit and scope of the present invention. For example, the clamping system 100 may vary in shape and/or size depending on the shape, size, and weight of the device to be mounted to the structure. Although the clamping system 100 has been illustrated in use with electronic devices such as speakers, the clamping system 100 can easily be adapted to any type of device or structure which requires a tool-free connection to a substrate.

What is claimed is:

1. A clamping system comprising:
   a housing;
   a first arm, including a generally rectangular plate portion with an exterior side and an interior side, wherein the first arm is coupled to the housing on the interior side, the first arm further including a first arm end;
   a clamping lever pivotally coupled to the first arm on the exterior side of the first arm, proximate to the first arm end, such that the clamping lever is rotatable in a plane generally perpendicular to the exterior side;
   a clamping arm pivotally coupled relative to the housing and pivotally coupled relative to the clamping lever, such that the clamping arm is rotatable in a plane generally perpendicular to the interior side; and
   whereby upon rotation of the clamping lever from an open position to a closed position, at least a portion of the clamping lever remains on the exterior side of the first arm, and the clamping arm is rotated towards the first arm end; and
   an expandable link pivotally coupled to the housing and the clamping arm.

2. The clamping system of claim 1, wherein the expandable link is a spring.

3. The clamping system of claim 1, wherein the expandable link is biased to pull the clamping arm towards the closed position.

4. A clamping system comprising:
   a housing;
   a first arm, including a generally rectangular plate portion with an exterior side and an interior side, wherein the first arm is coupled to the housing on the interior side, the first arm further including a first arm end;

a clamping lever pivotally coupled to the first arm on the exterior side of the first arm, proximate to the first arm end, such that the clamping lever is rotatable in a plane generally perpendicular to the exterior side;

a clamping arm pivotally coupled relative to the housing, the pivotal coupling relative to the housing comprising a link pivotally coupled to the clamping arm and to the housing, and the clamping arm pivotally coupled relative to the clamping lever, such that the clamping arm is rotatable in a plane generally perpendicular to the interior side; and whereby upon rotation of the clamping lever from an open position to a closed position, at least a portion of the clamping lever remains on the exterior side of the first arm, and the clamping arm is rotated towards the first arm end.

5. A clamping system comprising:

a housing;

a first arm, including a generally rectangular plate portion with an exterior side and an interior side, wherein the first arm is coupled to the housing on the interior side, the first arm further including a first arm end;

a clamping lever pivotally coupled to the first arm on the exterior side of the first arm, proximate to the first arm end, such that the clamping lever is rotatable in a plane generally perpendicular to the exterior side;

a clamping arm pivotally coupled relative to the housing, the pivotal coupling relative to the housing comprising a link pivotally coupled to the clamping arm and to the housing, and pivotally coupled relative to the clamping lever, the pivotal coupling relative to the clamping lever comprising a link pivotally coupled to the clamping arm and to the clamping lever, such that the clamping arm is rotatable in a plane generally perpendicular to the interior side; and whereby upon rotation of the clamping lever from an open position to a closed position, at least a portion of the clamping lever remains on the exterior side of the first arm, and the clamping arm is rotated towards the first arm end.

6. The clamping system of claim 5, wherein the link pivotally coupled to the clamping arm and the housing and the link pivotally coupled to the clamping arm and the clamping lever share a pivot point on the clamping arm.

* * * * *